US006970467B1

(12) United States Patent
Sunaga et al.

(10) Patent No.: US 6,970,467 B1
(45) Date of Patent: Nov. 29, 2005

(54) TRANSFER SCHEME FOR SPEECH AND VOICE BAND SIGNALS AND ISDN DIGITAL SIGNALS USING REDUCED TRANSMISSION BANDWIDTH OVER ATM

(75) Inventors: Ikuo Sunaga, Tokyo (JP); Hiroyuki Matsumoto, Warabi (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/238,368

(22) Filed: Jan. 27, 1999

(30) Foreign Application Priority Data

Jan. 28, 1998 (JP) ............................... P10-015968

(51) Int. Cl.[7] ........................ H04L 12/28; H04L 12/66; H04J 3/16

(52) U.S. Cl. .................. 370/395.1; 370/352; 370/401; 370/474; 370/466

(58) Field of Search ............................... 370/351–356, 370/474, 488, 395.1, 395.21, 395.6, 395.61, 370/395.63, 395.64, 395.65, 401–402, 466, 370/428

(56) References Cited

U.S. PATENT DOCUMENTS

| | | | | |
|---|---|---|---|---|
| 5,317,562 A * | 5/1994 | Nardin et al. | 370/428 |
| 5,883,893 A * | 3/1999 | Rumer et al. | 370/474 |
| 5,982,783 A * | 11/1999 | Frey et al. | 370/395.6 |
| 6,038,231 A * | 3/2000 | Dolby et al. | 370/474 |
| 6,075,798 A * | 6/2000 | Lyons et al. | 370/474 |
| 6,169,738 B1 * | 1/2001 | Sriram et al. | 370/395.21 |
| 6,178,170 B1 * | 1/2001 | Duree et al. | 370/395.61 |
| 6,266,343 B1 * | 7/2001 | Caves | 370/474 |
| 6,282,196 B1 * | 8/2001 | Lyons et al. | 370/474 |
| 6,324,174 B2 * | 11/2001 | Bharucha et al. | 370/395.61 |

FOREIGN PATENT DOCUMENTS

| | | |
|---|---|---|
| EP | 0 820 052 A2 | 1/1998 |
| WO | WO 92/16066 | 9/1992 |

OTHER PUBLICATIONS

European Search report dated Jun. 2, 1999.

* cited by examiner

*Primary Examiner*—Steven Nguyen
(74) *Attorney, Agent, or Firm*—Olson & Hierl, Ltd.

(57) ABSTRACT

A transfer scheme for speech and voice band signals and ISDN digital signals which is capable of reducing a transmission bandwidth required for communications of speech, FAX, voice band data and ISDN digital signals that are to be entered from the STM network to the ATM network, and reducing the ATM cell assembling delay time, is disclosed. In the ATM cell multiplexing at the transmitting side, the signal type judgement results for the signals entered from the STM network are notified to the ATM cell multiplexing unit, and these signals are multiplexed into the ATM cell according to the notified signal types so that it becomes possible to multiplex the signals for each input signal type separately, and it becomes possible to treat the STM signals with different network qualities for different signal types as a single ATM connection in which only the input signals with the same quality requirement are multiplexed within the ATM network.

14 Claims, 4 Drawing Sheets

TRANSFER SCHEME FOR SPEECH AND VOICE BAND SIGNALS AND ISDN DIGITAL SIGNALS USING REDUCED TRANSMISSION BANDWIDTH OVER ATM

BACKGROUND OF THE INVENTION

1. Field of the Invention

The present invention relates to a transfer scheme for speech and voice band signals and ISDN (Integrated Services Digital Network) digital signals which transfers speech and voice band signals and ISDN digital signals entered from an STM (Synchronous Transfer Mode) network to an ATM (Asynchronous Transfer Mode) network by assembling ATM cells from them and transferring ATM cells entered from the ATM network to the STM network by converting them into STM signals, at a connection point between the ATM network and the STM network.

2. Description of the Background Art

In the conventional STM network, signals are constantly transmitted through transmission channels regardless of presence or absence of communications such that unnecessary signals will occupy the transmission channels, and therefore it is impossible to realize an efficient utilization of transmission bandwidth. Also, at a time of transferring valid signals, the speech and voice band signals constantly occupy a certain transmission bandwidth even with respect to those signals which do not necessarily require the transmission bandwidth of one channel, so that it has been impossible to realize an efficient utilization of transmission channels.

Moreover, in the STM network in which signal compression is to be used, a compression scheme to be used is fixed, or the multiplexing of a plurality of signals after the compression is carried out in units of an input channel group that are fixed in advance. In a DCME (Digital Circuit Multiplication Equipment) used as a speech compression equipment, it is impossible to judge a type of each received signal when compressed signals are received, so that there is a need to constantly carry out inter-equipment communications between transmitting and receiving DCMEs in order to make a mutual synchronization.

As described, conventionally, signals after the compression can be multiplexed only in units of an channel group that are fixed in advance, the transmitting network is always the same network, and the network quality for signals is always the same regardless of signal types so that it has been impossible to carry out separate communications depending on a signal type and it has been impossible to transfer signals of each signal type to a network suitable for its required quality.

Also, in the case of changing the compression scheme dynamically with respect to one communication call at the transmitting side using a plurality of compression schemes, there is a need to constantly carry out communications for control purpose between the transmitting side equipment and the receiving side equipment and make a synchronization between these equipments in order for the receiving side to recognize the compression scheme applied to each received signal, and it is necessary to provide a transmission bandwidth for this purpose.

SUMMARY OF THE INVENTION

It is therefore an object of the present invention to provide a transfer scheme for speech and voice band signals and ISDN digital signals which is capable of reducing a transmission bandwidth of the ATM network required for communications of speech, FAX, voice band data and ISDN digital signals that are to be entered from the STM network to the ATM network, and reducing the ATM cell assembling delay time.

According to one aspect of the present invention there is provided a transfer method for transferring speech and voice band signals and ISDN (Integrated Services Digital Network) digital signals between an ATM network and an STM (Synchronous Transfer Mode) network, the transfer method comprising the steps of: (a) obtaining a silence information by detecting silence sections in input signals entered from the STM network; (b) obtaining a signal type information for each input signal by judging whether each input signal is a speech and voice band signal or an ISDN digital signal and judging a signal type of the speech and voice band signal when each input signal is the speech and voice band signal; (c) dynamically changing a compression scheme of each input signal into a most appropriate compression scheme according to the silence information obtained at the step (a) and the signal type information obtained at the step (b), and compressing each input signal using the most appropriate compression scheme; (d) assembling variable length packets each having a length shorter than that of an ATM cell from signals compressed at the step (c) using the silence information obtained at the step (a) and the signal type information obtained at the step (b); (e) assembling ATM cells by multiplexing a plurality of the variable length packets assembled at the step (d), and transferring the ATM cells to the ATM network; (f) receiving input ATM cells from the ATM network and disassembling the input ATM cells into received packets; (g) disassembling the received packets obtained at the step (f) into received signals; (h) judging a signal compression scheme of each received signal obtained at the step (g); (i) expanding each received signal using the signal compression scheme judged at the step (h); and (j) reproducing silence sections in signals expanded at the step (i) so as to generate STM signals, and transferring the STM signals to the STM network.

According to another aspect of the present invention there is provided a transmitting side device for transferring speech and voice band signals and ISDN (Integrated Services Digital Network) digital signals from an STM (Synchronous Transfer Mode) network to an ATM network, the device comprising: a silence detection unit for obtaining a silence information by detecting silence sections in input signals entered from the STM network; a signal type judgement unit for obtaining a signal type information for each input signal by judging whether each input signal is a speech and voice band signal or an ISDN digital signal and judging a signal type of the speech and voice band signal when each input signal is the speech and voice band signal; a signal compression unit for dynamically changing a compression scheme of each input signal into a most appropriate compression scheme according to the silence information obtained by the silence detection unit and the signal type information obtained by the signal type judgement unit, and compressing each input signal using the most appropriate compression scheme; a packet assembling unit for assembling variable length packets each having a length shorter than that of an ATM cell from signals compressed by the signal compression unit using the silence information obtained by the silence detection unit and the signal type information obtained by the signal type judgement unit; and an ATM cell assembling unit for assembling ATM cells by multiplexing a plurality of the variable length packets assembled by the packet assembling unit, and transferring the ATM cells to the ATM network.

According to another aspect of the present invention there is provided a receiving side device for transferring speech and voice band signals and ISDN (Integrated Services Digital Network) digital signals from an ATM network to an STM (Synchronous Transfer Mode) network, the device comprising: an ATM cell disassembling unit for receiving input ATM cells from the ATM network and disassembling the input ATM cells into received packets; a packet disassembling unit for disassembling the received packets obtained by the ATM cell disassembling unit into received signals; a signal compression scheme judgement unit for judging a signal compression scheme of each received signal obtained by the packet disassembling unit; a signal expansion unit for expanding each received signal using the signal compression scheme judged by the signal compression scheme judgement unit; and a silence reproduction unit for reproducing silence sections in signals expanded by the signal expansion unit so as to generate STM signals, and transferring the STM signals to the STM network.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 4, one embodiment of the transfer scheme over ATM for speech and voice band signals and ISDN digital signals according to the present invention will be described in detail.

Figure 1:
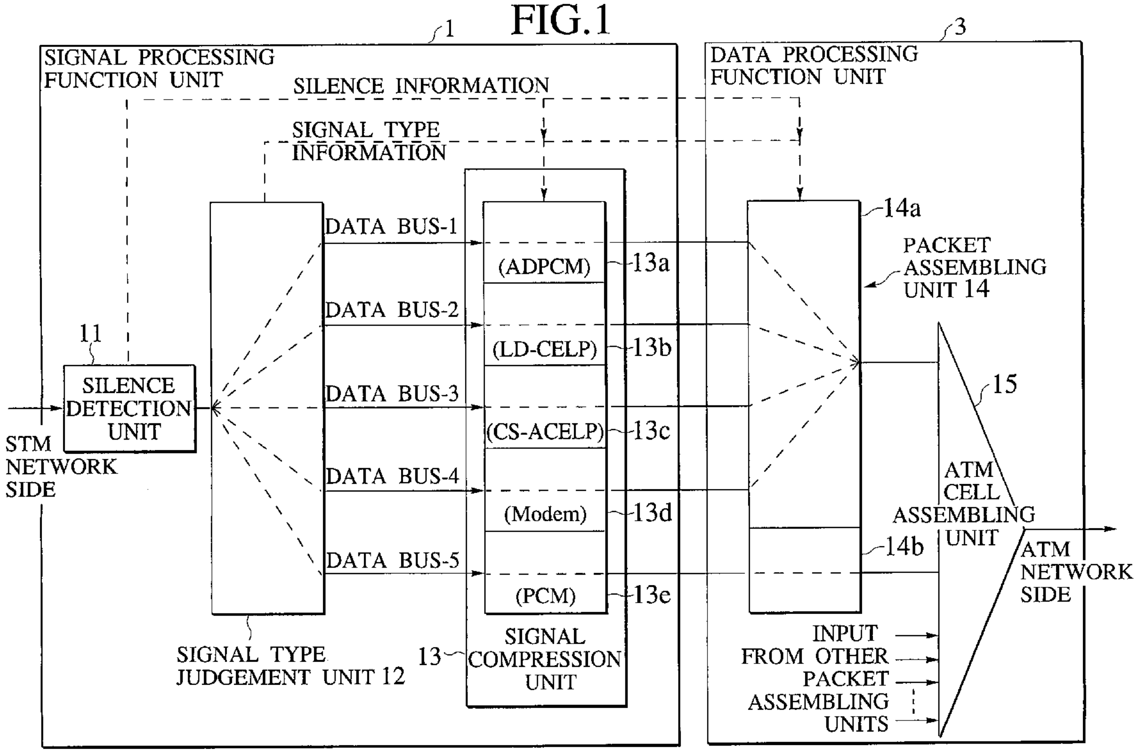
FIG. 1 is a block diagram of a transmitting side device for realizing the transfer scheme over ATM for speech and voice band signals and ISDN digital signals according to one embodiment of the present invention.
Figure 2:
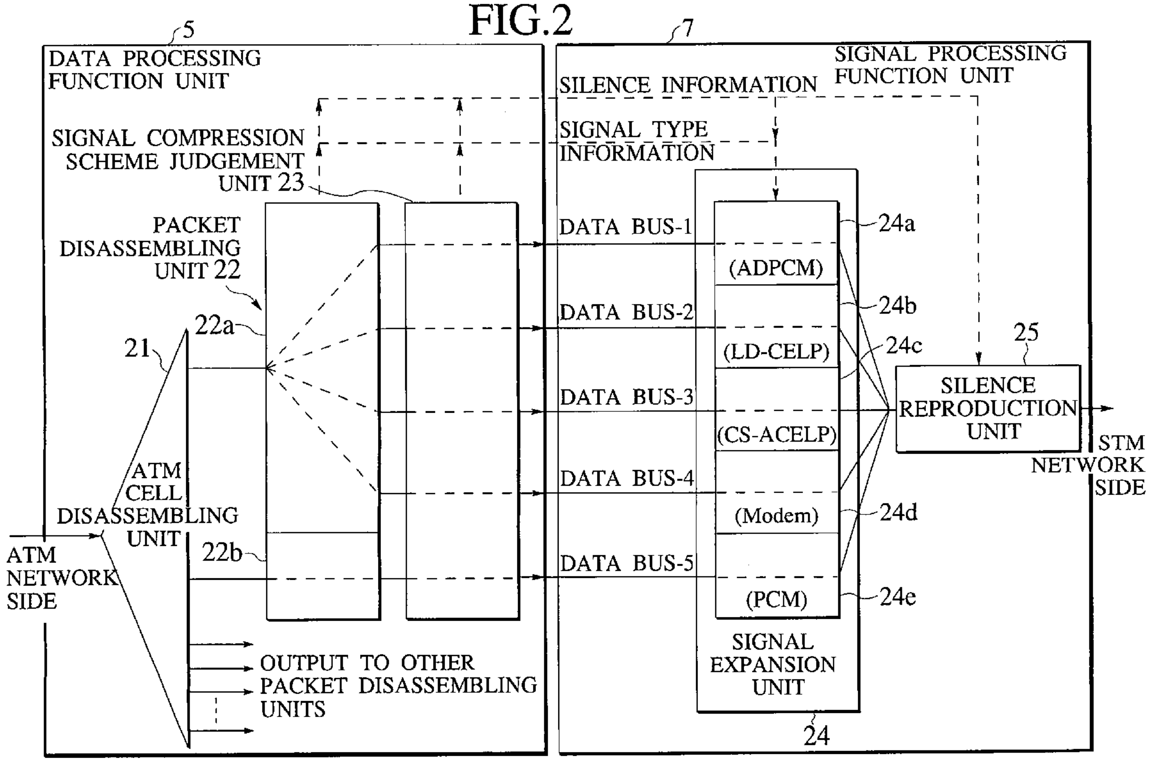
FIG. 2 is a block diagram of a receiving side device for realizing the transfer scheme over ATM for speech and voice band signals and ISDN digital signals according to one embodiment of the present invention.

FIG. 1 and FIG. 2 respectively show a transmitting side device and a receiving side device for realizing the transfer scheme over ATM for speech and voice band signals and ISDN digital signals according to one embodiment of the present invention. More specifically, the transmitting side device of FIG. 1 assembles ATM cells from various signals such as speech and voice band signals including speech, FAX, and voice band data and ISDN digital signals which are entered from an STM network, and transfers these ATM cells to an ATM network, while the receiving side device of FIG. 2 receives the ATM cells from the transmitting side device through the ATM network, converts these ATM cells into STM signals such as the speech and voice band signals including speech, FAX, and voice band data and ISDN digital signals, and transfers these signals to the STM network.

As shown in FIG. 1, the transmitting side device generally comprises a signal processing function unit 1 and a data processing function unit 3.

The signal processing function unit 1 further comprises: a silence detection unit 11 for obtaining silence information detected in signals entered from the STM network; a signal type judgement unit 12 for judging whether each signal entered from the STM network is the speech and voice band signal or the ISDN digital signal, and further judging a signal type of the speech and voice band signal in the case where entered signal is judged as the speech and voice band signal; and a signal compression unit 13 for dynamically changing a compression scheme of each signal from the STM network into a most appropriate compression scheme during communications according to the silence information detected by the silence detection unit 11 and the signal type information obtained by the signal type judgement unit 12, and compressing each entered signal using the most appropriate compression scheme.

Also, the data processing function unit 3 further comprises: a packet assembling unit 14 for assembling short packets such as AAL2 (ATM Adaptation Layer type 2) packets for example which are variable length packets shorter than the ATM cells, from the signals compressed by the signal compression unit 13, using the silence information from the silence detection unit 11 and the signal type information from the signal type judgement unit 12; and an ATM cell assembling unit 15 for assembling ATM cells from the short packets assembled by a plurality of packet assembling units 14, and outputting these ATM cells to the ATM network by multiplexing a plurality of ATM cells into a single ATM connection.

As shown in FIG. 2, the receiving side device generally comprises a data processing function unit 5 and a signal processing function unit 7.

The data processing function unit 5 further comprises: an ATM cell disassembling unit 21 for receiving ATM cells transferred from the transmitting side device of FIG. 1 to the ATM network and entered from the ATM network, and disassembling these ATM cells into packets; a packet disassembling unit 22 for disassembling packets generated by the ATM cell disassembling unit 21 so as to generate signals; and a signal compression scheme judgement unit 23 for judging a signal compression scheme of each signal generated by the packet disassembling unit 22.

Also, the signal processing function unit 7 further comprises: a signal expansion unit 24 for expanding signals using the signal compression scheme judged by the signal compression scheme judgement unit 23, and a silence reproduction unit 25 for reproducing silence sections in signals expanded by the signal expansion unit 24 so as to generate STM signals, and transferring these STM signals to the STM network.

The signal compression unit 13 of the transmitting side device includes a plurality of signal compression sub-units 13*a*, 13*b*, 13*c*, 13*d* and 13*e*, which respectively carry out signal compression using ADPCM (Adaptive Differential Pulse Code Modulation) scheme, LD-CELP (Low Delay-Code Excited Linear Prediction) scheme, CS-ACELP (Conjugate Structure-Algebraic Code Excited Linear Prediction) scheme, Modem demodulation scheme, and PCM (Pulse Code Modulation) scheme. The 64 kbit/s signals are compressed into 32 kbit/s signals by the ADPCM scheme, 16 kbit/s signals by the LD-CELP scheme, 8 kbit/s signals by the CS-ACELP scheme, while the Modem demodulation scheme is for FAX, where modulation is applied to the signals such that the signals can be demodulated at the receiving side because the FAX cannot be reproduced correctly at the receiving side if compressed, and the PCM scheme passes 64 kbit/s signals unchanged.

The packet assembling unit 14 of the transmitting side device includes a packet assembling sub-unit 14*a* for assembling packets from signals compressed by the ADPCM scheme, the LD-CELP scheme, the CS-ACELP scheme and the Modem demodulation scheme which are entered from the signal compression sub-units 13*a*, 13*b*, 13*c* and 13*d*, and a packet assembling sub-unit 14*b* for assembling packets from signals compressed by the PCM scheme which are entered from the signal compression sub-unit 13*e*.

The ATM cell assembling-unit 15 of the transmitting side device forms ATM cells from the packets formed by a plurality of packet assembling units 14, and transfers these ATM cells to the ATM network by multiplexing a plurality of ATM cells into a single ATM connection, where the multiplexing into a single ATM connection can be carried out in units of an input channel group entered from the STM network or the multiplexing of the signals entered from the STM network into a single ATM connection can be carried out in units of a signal type judged by the signal type judgement unit 12 so that it is possible to freely change a combination of data to be multiplexed such as the speech signals alone or the speech signals and FAX signals. Namely, the ATM cell assembling unit 15 has a plurality of multiplexing scheme such as the multiplexing in units of STM input channel group and the multiplexing in unit of signal compression scheme and changes the multiplexing scheme among these plurality of multiplexing schemes at a time of transferring the ATM cells to the ATM network by multiplexing them into a single ATM connection.

On the other hand, the packet disassembling unit 22 of the receiving side device has a packet disassembling sub-unit 22*a* and a packet disassembling sub-unit 22*b* in correspondence to the packet assembling sub-units 14*a* and 14*b* of the packet assembling unit 14, while the signal expansion units 24 of the receiving side device has signal expansion sub-units 24*a*, 24*b*, 24*c*, 24*d* and 24*e* which respectively carry out signal expansion using ADPCM scheme, LD-CELP scheme, CS-ACELP scheme, Modem demodulation scheme, and PCM scheme, in correspondence to the signal compression sub-units 13*a*, 13*b*, 13*c*, 13*d* and 13*e* of the signal compression unit 13.

The signal compression scheme judgement unit 23 of the receiving side device judges the signal compression type of each packet according to the packet length of the variable length packet, at a time of judging the signal type of the short variable length packet within each ATM cell. Namely, the packet assembling unit 14 of the transmitting side device uses packets with different packet lengths depending on data processed, so that it is possible to identify the signal compression scheme of each packet by detecting the packet length of each packet.

Figure 3:
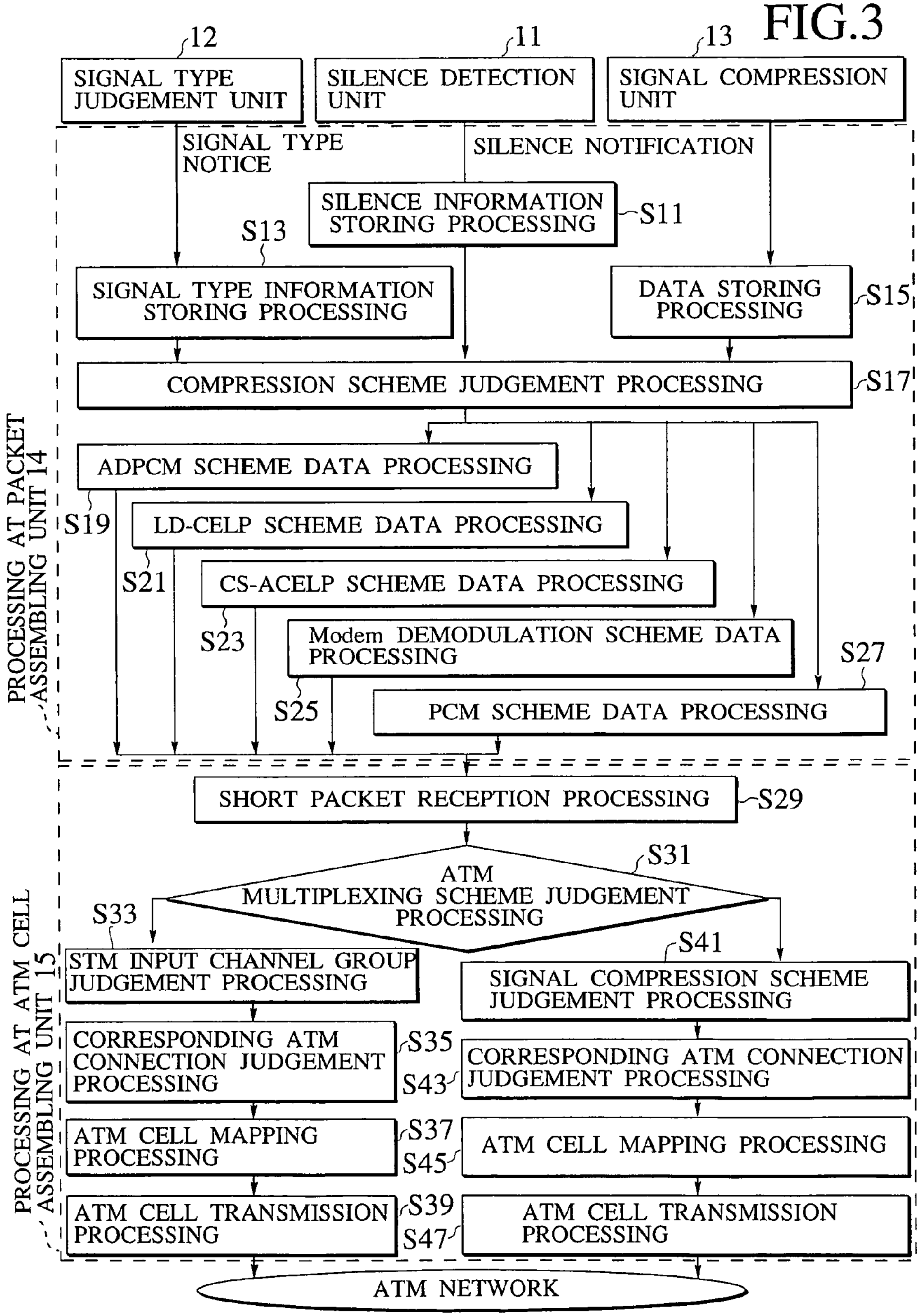
FIG. 3 is a flow chart for the operation of the transmitting side device of FIG. 1.
Figure 4:
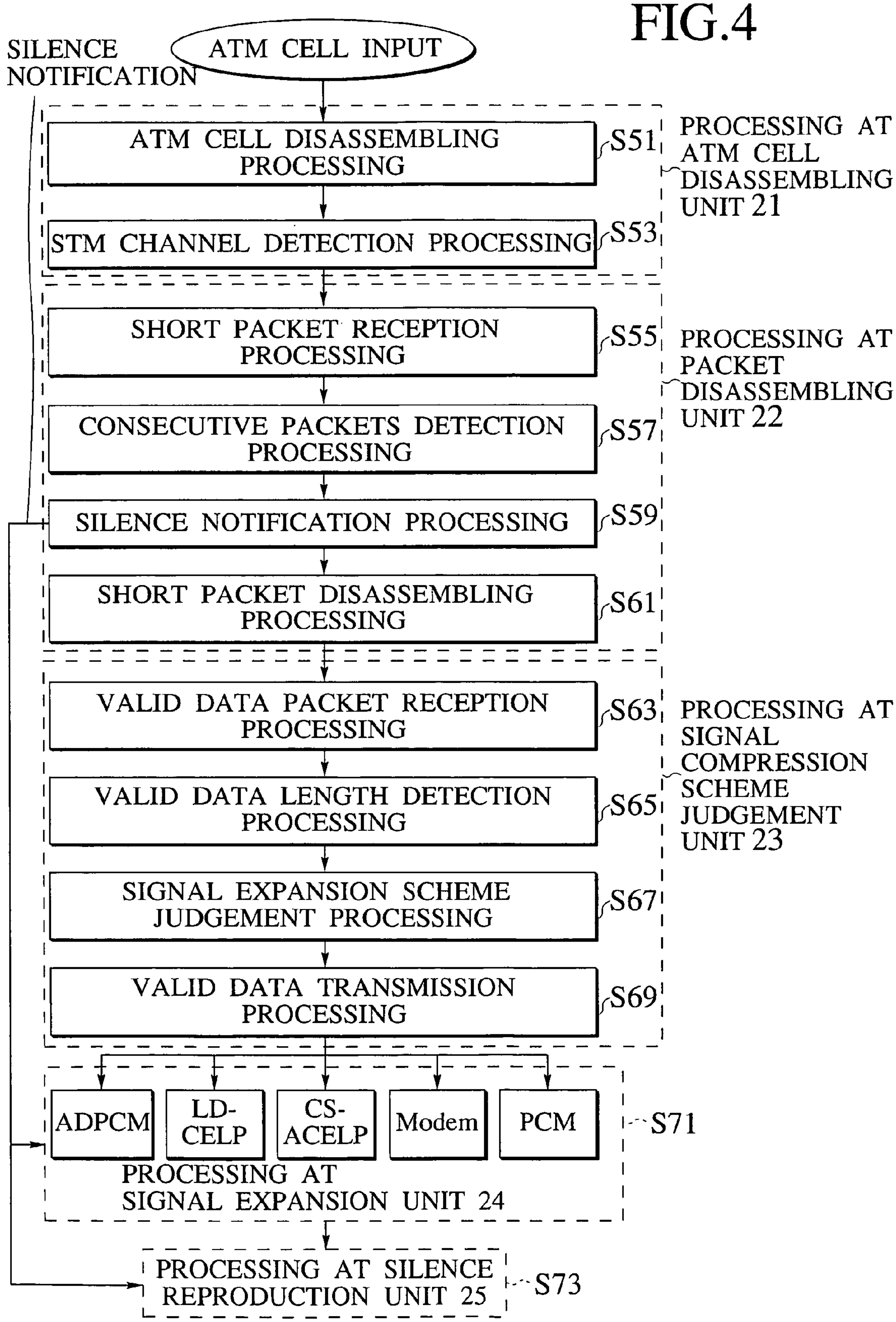
FIG. 4 is a flow chart for the operation of the receiving side device of FIG. 2.

Next, with references to FIG. 3 and FIG. 4, the operations of the transmitting side device and the receiving side devices of FIG. 1 and FIG. 2 will be described.

First, with reference to FIG. 3, the operation of the transmitting side device will be described. One or a plurality of speech, FAX, and voice band data and ISDN digital signals entered from the STM network to the transmitting side device of FIG. 1 are supplied to the silence detection unit 11, the signal type judgement unit 12 and the signal compression unit 13. At the silence detection unit 11, the silence section in each received signal is detected, and the obtained silence information is notified to the packet assembling unit 14 and stored therein (step S11). Also, at the signal type judgement unit 12, a signal type of each received signal is judged, and the obtained signal type information is notified to the packet assembling unit 14 and stored therein (step S13). In this signal type judgement processing at the signal type judgement unit 12, whether the signal from the STM network is the speech and voice band signal or the ISDN digital signal is judged first, and when it is judged as the speech and voice band signal, a signal type of the speech and voice band signal is judged further.

Also, at the signal compression unit 13, the compression scheme of the input signal is dynamically changed during communications to the most appropriate compression scheme using the silence information obtained by the silence detection unit 11 and the signal type information obtained by the signal type judgement unit 12 such that the input signal is compressed by this most appropriate compression scheme, and the compressed data are entered and stored in the packet assembling unit 14 (step S15). The signal compression at the signal compression unit 13 is carried out by one of a plurality of signal compression sub-units 13*a*, 13*b*, 13*c*, 13*d* and 13*e* using the ADPCM scheme, LD-CELP scheme, the CS-ACELP scheme, the Modem demodulation scheme, and the PCM scheme, respectively.

The packet assembling unit 14 then carries out the signal compression scheme judgement processing (step S17) to judge the signal compression scheme of data stored at the step S15 according to the signal type information obtained from the signal type judgement unit 12. This signal compression scheme is one of the ADPCM scheme, the LD-CELP scheme, the CS-ACELP scheme, the Modem demodulation scheme, and the PCM scheme described above.

In the ADPCM scheme data processing (step S19), the ending time of the silence section is detected by matching the stored silence and speech information, the stored continuous data are segmented in units of a prescribed data length (11 octets, for example), and the packets are assembled. The segmentation using the same data length and the packet assembling are also applied to the subsequently stored continuous data as well. Also, after attaching an information indicating the first non-silence section to a header of the short packet such as AAL2 packet, it is transmitted to the ATM cell assembling unit 15. Also, by matching the speech and silence information, those assembled packets whose data section is entirely silence are discarded. In addition, for those assembled packets whose data section is non-silence, an immediately previous sequence counter value is incremented by one and attached to a header of the short packet, and these packets are transmitted to the ATM cell assembling unit 15.

In the LD-CELP scheme data processing (step S21), the processing similar to the ADPCM scheme data processing of the step S19 is carried out except that the packet assembling is carried out using the packet length of the LD-CELP scheme (5 octets)×n (where n is a positive integer).

In the CS-ACELP scheme data processing (step S23), the processing similar to the ADPCM scheme data processing of the step S19 is carried out except that the packet assembling is carried out using the packet length of the CS-ACELP scheme (10 octets)×n (where n is a positive integer).

In the Modem demodulation scheme data processing (step S25) and the PCM scheme data processing (step S27), the processing similar to the ADPCM scheme data processing of the step S19 is carried out.

The packets generated in this way at the packet assembling unit 14, i.e., the short packets such as AAL2 packets, are then received and stored by the ATM cell assembling unit 15 (step S29). The ATM cell assembling unit 15 then applies the ATM multiplexing scheme judgement processing (step S31) to the stored short packets. In this ATM multiplexing scheme judgement processing, a scheme for mapping short packets to the ATM cell is judged for the stored short packets according to a prescribed one of a plurality of schemes for mapping to the ATM cell including the mapping per STM input channel group and the mapping per signal compression scheme (step S31). In the case where the judgement result is the mapping per STM input channel group, the STM input channel group judgement processing is carried out (step S33), and in the case where the judgement result is the mapping per signal compression scheme, the signal compression scheme judgement processing is carried out (step S41).

In the STM input channel group judgement processing in the case of the mapping per STM input channel group, the corresponding ATM connection is judged for the short packets stored at the step S29 by referring to the ATM connection information set up for the corresponding channel group (step S35). Then, the stored short packets are mapped to the payload of the ATM cell on the corresponding one ATM connection by First In First Out policy for each input channel group of the STM network judged at the step S31 (step S37), and after the payload in the ATM cell is entirely filled by this mapping, the ATM cell is transmitted to the ATM network (step S39). Also, a timer is activated when the first short packet is mapped to each ATM cell and when this timer expires, even if the payload in the ATM cell is not entirely filled, an invalid data is given to the payload in the ATM cell where no data has been mapped, and the ATM cell is transmitted to the ATM network (step S39).

On the other hand, in the signal compression scheme judgement processing in the case of the mapping per signal compression scheme, the corresponding ATM connection is judged for the short packets stored at the step S29 by referring to the ATM connection information set up for the corresponding signal compression scheme (step S43). Then, the stored short packets are mapped to the payload of the ATM cell on the corresponding one ATM connection by First In First Out Policy for each signal compression scheme judged at the step S41 (step S45), and after the payload in the ATM cell is entirely filled by this mapping, the ATM cell is transmitted to the ATM network (step S47). Also, a timer is activated when the first short packet is mapped to each ATM cell and when this timer expires, even if the payload in the ATM cell is not entirely filled, an invalid data is given to the payload in the ATM cell where no data has been mapped, and the ATM cell is transmitted to the ATM network (step S47).

Next, with reference to FIG. 4, the operation of the receiving side device of FIG. 2 will be described. The ATM cell entered from the ATM network at the receiving side device of FIG. 2 is received by the ATM cell disassembling unit 21 and disassembled from 53 bytes ATM cell into short packets (step S51). Then, according to the short packet connection identifier field value in each disassembled short packet, each short packet is transferred to the packet disassembling unit 22 of a channel which is in one-to-one correspondence to a channel on the STM side which is specified in advance to that short packet connection identifier value (the short packet identifier 1=STM side channel number 1, the short packet identifier value 2=STM side channel number 2, and so on, for example) (step S53).

The packet disassembling unit 22 then receives and stores the short packet transferred from the ATM cell disassembling unit 21 (step S55). Then, the first packet of the continuous data, or the intermediate packet of the continuous data, is detected according to the UUI (User-User Information) field value in the short packet header of this short packet (step S57).

More specifically, this packet detection can be realized as follows. At the transmitting side for transferring the packet to the ATM network, the packet assembling unit 14 eliminates the silence section detected by the silence detection unit 11, assembles packets only from the non-silence section, and transmits the packets to the ATM cell assembling unit 15 while using the sequence counter ranging from 0 to 7 in the headers of the short packets in this transmission such that 0 is used for the first short packet of the non-silence section and 1 to 7 are repeatedly used for the subsequent consecutive short packets until the silence section occurs, and the sequence counter is reset when the silence section occurs such that 0 is used for the first short packet of the next non-silence section and 1 to 7 are repeatedly used for the subsequent consecutive short packets.

Then, at the ATM cell receiving side, the short packets assembled only from the non-silence section by eliminating the silence section are received, while the sequence counter value in the headers of the short packets are detected in the processing for receiving the short packets in the ATM cell such that the short packet for which the sequence counter value is 0 is detected as the first packet of the non-silence section and the short packets for which the sequence counter values are 1 to 7 are detected as the packets of the consecutive non-silence section. In this way, the first short packet of the non-silence section is detected, and if there is any loss of the consecutive short packets of the non-silence section between the transmitting side and the receiving side, the occurrence of the loss as well as the number of lost short packets are detected.

Then, each silence section is detected as a no signal period preceding each packet with the sequence counter value 0, and the silence information indicating the detected silence sections is notified to the signal expansion unit 24 and the silence reproduction unit 25 (step S59). Then, the packet disassembling unit 22 removes the short packet headers and transmits the remaining valid data packets to the signal compression scheme judgement unit 23 (step S61).

The signal compression scheme judgement unit 23 receives and stores the valid data packets transferred from the packet disassembling unit 22 (step S63), and detects the packet length of the stored valid data packets (step S65). Then, the signal compression scheme judgement unit 23 judges the signal expansion scheme of the stored valid data packets by matching the packet length of the stored valid data packets with the packet length uniquely specified for each of the ADPCM scheme, the LD-CELP scheme, the CS-ACELP scheme, the Modem demodulation scheme, and the PCM scheme available in the signal expansion unit 24 (n octets, where n is a positive integer: 11 octets for the ADPCM scheme, 5 octets for the LD-CELP scheme, 10 octets for the CS-ACELP scheme, 9 octets for the Modem demodulation scheme, and 20 octets for the PCM scheme, for example) (step S67).

The signal compression scheme judgement unit 23 then transmits the valid data packets to the signal expansion sub-units 24*a* to 24*e* corresponding to the signal expansion schemes so judged (step S69). The signal expansion sub-units 24*a* to 24*e* of the signal expansion unit 24 then carries out the expansion processing for the valid data using the ADPCM scheme, the LD-CELP scheme, the CS-ACELP scheme, the Modem demodulation scheme, and the PCM scheme respectively (step S71), and supply the expanded data to the silence reproduction unit 25.

Here, the signal expansion sub-units 24*a* to 24*e* of the signal expansion unit 24 apply the most appropriate loss compensation scheme when the loss of packet is encountered during the expansion processing in such a way that, when the received packet with the sequence counter value 0 is detected, the signal expansion unit 24 resets an algorithm of the signal compression scheme by taking the received packet with the sequence counter value 0 as the first packet of the non-silence section, so as to enable improvement of a quality of reproduced speech and voice band signals, and when the loss of packet is detected, the signal expansion unit 24 makes a judgement as to whether a lost packet is the first packet of the non-silence section or one of the subsequent packets of the non-silence section, and applies a most appropriate loss compensation scheme according to a result of the judgement.

Note that the loss of the first packet of the non-silence section can be identified by detecting an occurrence of packets with the sequence counter values other than 0 which are immediately preceded not by a packet with the sequence counter value 0 but by a no signal period longer than a prescribed length.

Note also that the most appropriate loss compensation scheme for each case can be any known loss compensation scheme such as those described in the ITU-U recommendation G.728 and G.729, for example.

The silence reproduction unit 25 reproduces the silence sections in the expanded data from the signal expansion unit 24 according to the silence information notified from the packet disassembling unit 22 at the step S59, and transfers the resulting data as the STM signals to the STM network (step S73).

As described, according to the present invention, in the ATM cell multiplexing at the transmitting side, the signal type judgement results for the signals entered from the STM network are notified to the ATM cell multiplexing unit, and these signals are multiplexed into the ATM cell according to the notified signal types so that it becomes possible to multiplex the signals for each input signal type separately, and it becomes possible to treat the STM signals with different network qualities for different signal types as a single ATM connection in which only the input signals with the same quality requirement are multiplexed within the ATM network. Also, it becomes possible to reduce the transmission bandwidth required for communications as well as the ATM cell assembling delay time. In addition, by attaching the channel number identifiers corresponding to the STM network channels at the transmitting side, it becomes possible for the receiving side to identify corresponding channels on the ATM network side from the received ATM cells or variable length signal packets.

Also, according to the present invention, the signal compression scheme applied at the transmitting side is judged according to the packet length of the variable length packet in the ATM cell received from the ATM network, so that it becomes possible to judge the signal compression scheme applied by the transmitting side equipment by setting the packet length of the variable length packet and the signal compression scheme in correspondence in advance. Consequently, an identifier for identifying the signal compression scheme in the ATM cell becomes unnecessary so that the the utilization efficiency of the payload in the ATM cell can be improved.

In addition, according to the present invention, a plurality of schemes for multiplexing into the ATM connection including the multiplexing per STM input channel group and the multiplexing per signal compression scheme can be provided and the multiplexing scheme can be changed freely among these plurality of multiplexing schemes.

It is to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A transfer method for transferring speech and voice band signals and ISDN (Integrated Services Digital Network) digital signals between an ATM (Asynchronous Transfer Mode) network and an STM (Synchronous Transfer Mode) network, the transfer method comprising the steps of:

(a) obtaining a silence information by detecting silence sections in input signals entered from the STM network;

(b) obtaining a signal type information for each input signal by judging whether each input signal is a speech and voice band signal or an ISDN digital signal, and further judging a signal type of each input signal that is judged as the speech and voice band signal;

(c) dynamically changing a compression scheme of each input signal into a most appropriate compression scheme selected from a plurality of different compression schemes with different compression rates, which is determined by using the silence information obtained at the step (a) and the signal type information obtained at the step (b), and compressing each input signal using the most appropriate compression scheme;

(d) assembling variable length packets each having a length shorter than that of an ATM cell from signals compressed at the step (c) by using the silence information obtained at the step (a) and the signal type information obtained at the step (b);

(e) assembling ATM cells by multiplexing a plurality of the variable length packets assembled at the step (d), and transferred the ATM cells to the ATM network;

(f) receiving input ATM cells from the ATM network and disassembling the input ATM cells into received packets;

(g) disassembling the received packets obtained at the step (f) into received, and obtaining a silence section information by detecting positions at which silence sections are to be inserted in the receiving signals entered from the ATM network;

(h) judging a signal compression scheme of each received signal obtained at the step (g);

(i) expanding each received signal by using the silence section information obtained at the step (g) and the signal compression scheme judged at the step (h); and (j) reproducing silence sections in signals expanded at the step (i) by using the silence section information obtained at the step (g) so as to generate STM signals, and transferring the STM signals to the STM network.

2. The transfer method of claim 1, wherein the step (h) judges the signal compression scheme of each received signal obtained from each received packet according to a packet length of each received packet which is a variable length packet.

3. The transfer method of claim 1, wherein the step (e) assembles the ATM cells by multiplexing the variable length packets into an ATM connection in units of STM input channel group.

4. The transfer method of claim 1, wherein the step (e) assembles the ATM cells by multiplexing the variable length packets into an ATM connection in units of a signal type indicated by the signal type information obtained at the step (b).

5. The transfer method of claim 1, wherein the step (d) at an ATM cell transmitting side assembles the variable length packets only from non-silence sections by eliminating silence sections indicated by the silence information from signals compressed at the step (c), while using a sequence counter with a value ranging from 0 to 7 in headers of the variable length packets such that a value 0 is used for a first packet of each non-silence section, values 1 to 7 are used repeatedly for subsequent packets of each non-silence section, and a sequence counter is reset when a silence section occurs;

the step (f) at an ATM cell receiving side receives the input ATM cells containing the received packets that are assembled only from non-silence sections by eliminating silence sections, and the step (g) detects a sequence counter value in a header of each received packet such that a received packet with the sequence counter value 0 is detected as a first packet of each non-silence section and received packets with the sequence counter values 1 to 7 are detected as subsequent packets of each non-silence section, so as to detect the first packet of each non-silence section as well as an occurrence of a loss of packets and a number of lost packets for each non-silence section when there is a loss of any consecutive packets of each non-silence section between a transmitting side and a receiving side; and when the received packet with the sequence counter value 0 is detected, the step (i) resets an algorithm of the signal compression scheme by taking the receiving packet with the sequence counter value 0 as the first packet of the non-silence section, so as to enable improvement of a quality of reproduced speech and voice band signals, and when a loss of packet is detected, the step (i) makes a judgement as to whether a lost packet is the first packet of the non-silence section or one of the subsequent packets of the non-silence section, and applies a most appropriate loss compensation scheme according to a result of the judgement.

6. The transfer method of claim 1, wherein the step (e) changes a scheme for multiplexing a plurality of the variable length packets into an ATM connection among a plurality of schemes for multiplexing into an ATM connection including a multiplexing in units of STM input channel group and a multiplexing in units of signal compression scheme.

7. A transmitting side device for transferring speech and voice band signals and ISDN (Integrated Services Digital Network) digital signals from an STM (Synchronous Transfer Mode) network to an ATM (Asynchronous Transfer Mode) network, the device comprising:

a silence detection unit for obtaining a silence information by detecting silence sections in input signals entered from the STM network;

a signal type judgement unit for obtaining a signal type information for each input signal by judging whether each input signal is a speech and voice band signal or an ISDN digital signal, and further judging a signal type of each input signal that is judged as the speech and voice band signal;

a signal compression unit for dynamically changing a compression scheme of each input signal into a most appropriate compression scheme selected from a plurality of different compression schemes with different compression rates, which is determined by using the silence information obtained by the silence detection unit and the signal type information obtained by the signal type judgement unit, and compressing each input signal using the most appropriate compression scheme;

a packet assembling unit for assembling variable length packets each having a length shorter than that of an ATM cell from signals compressed by the signal compression unit by using the silence information obtained by the silence detection unit and the signal type information obtained by the signal type judgement unit; and an ATM cell assembling unit for assembling ATM cells by multiplexing a plurality of the variable length packets assembled by the packet assembling unit, and transferring the ATM cells to the ATM network.

8. The device of claim 7, wherein the ATM cell assembling unit assembles the ATM cells by multiplexing the variable length packets in units of STM input channel group into an ATM connection.

9. The device of claim 7, wherein the ATM cell assembling unit assembles the ATM cells by multiplexing the variable length packets in units of a signal type indicated by the signal type information obtained by the signal type judgement unit into an ATM connection.

10. The device of claim 7, wherein the packet assembling unit assembles the variable length packets only from non-silence sections by eliminating silence sections indicated by the silence information from signals compressed by the signal compression unit, while using a sequence counter with a value ranging from 0 to 7 in headers of the variable length packet such that a value 0 is used for a first packet of each non-silence section, values 1 to 7 are used repeatedly for subsequent packets of each non-silence section, and a sequence counter is reset when a silence section occurs.

11. The device of claim 7, wherein the ATM cell assembling unit changes a scheme for multiplexing a plurality of the variable length packets into an ATM connection among a plurality of schemes for multiplexing into an ATM connection including a multiplexing in units of STM input channel group and a multiplexing in units of a signal compression scheme.

12. A receiving side device for transferring speech and voice band signals and ISDN (Integrated Services Digital Network) digital signals from an ATM (Asynchronous Transfer Mode) network to an STM (Synchronous Transfer Mode) network, the device comprising:

an ATM cell disassembling unit for receiving input ATM cells from the ATM network and disassembling the input ATM cells into received packets;

a packet disassembling unit for disassembling the received packets obtained by the ATM cell disassembling unit into received signals, and obtaining a silence section information by detecting positions at which silence sections are to be inserted in the received signals entered from the ATM network;

a signal compression scheme judgement unit for judging a signal compression scheme of each received signal obtained by the packet disassembling unit, as one or a plurality of different compression schemes with different compression rates;

a signal expansion unit for expanding each received signal by using the silence section information obtained by the packet disassembling unit and the signal compression scheme judged by the signal compression scheme judgement unit; and a silence reproduction unit for reproducing silence sections in signals expanded by the signal expansion unit by using the silence section information obtained by the packet disassembling unit so as to generate STM signals, and transferring the STM signals to the STM network.

13. The device of claim 12, wherein the signal compression scheme judgement unit judges the signal compression scheme of each received signal obtained from each received packet according to a packet length of each received packet which is a variable length packet.

14. The device of claim 12, wherein the ATM cell disassembling unit receives the input ATM cells containing the received packets that are assembled only from non-silence sections by eliminating silence sections, and the packet disassembling unit detects a sequence counter value in a header of each received packet such that a received packet with the sequence counter value 0 is detected as a first packet of each non-silence section and received packets with the sequence counter values 1 to 7 are detected as subsequent packets of non-silence section, so as to detect the first packet of each non-silence section as well as an occurrence of a loss of packets and a number of lost packets for each non-silence section when there is a loss of any consecutive packets of each non-silence section between a transmitting side and a receiving side; and when the receiving packet with the sequence counter value 0 is detected, the signal expansion unit resets an algorithm of the signal compression scheme by taking the received packet with the sequence counter value 0 as the first packet of the non-silence section, so as to enable improvement of a quality of reproduced speech and voice band signals, and when a loss of packet is detected, the signal expansion unit makes a judgement as to whether a lost packet is the first packet of the non-silence section or one of the subsequent packets of the non-silence section, and applies a most appropriate loss compensation scheme according to a result of the judgement.

* * * * *